United States Patent [19]
Barnum et al.

[11] Patent Number: 5,277,288
[45] Date of Patent: * Jan. 11, 1994

[54] CLUTCH FOR TIRE LIFT/CARRIER WINCH

[75] Inventors: Charles E. Barnum, Ada; Donald R. Rempinski, Grand Haven; Donald R. Britt, Grand Rapids, all of Mich.

[73] Assignee: Sparton Corporation, Jackson, Mich.

[*] Notice: The portion of the term of this patent subsequent to Jul. 2, 2008 has been disclaimed.

[21] Appl. No.: 898,308

[22] Filed: Jun. 15, 1992

Related U.S. Application Data

[63] Continuation of Ser. No. 631,965, Mar. 14, 1991, which is a continuation of Ser. No. 345,577, May 1, 1989, Pat. No. 5,027,933.

[51] Int. Cl.⁵ .................... F16D 7/02; F16D 43/02
[52] U.S. Cl. .................... 192/56 L; 192/56 R; 464/37
[58] Field of Search .................. 192/56R; 56L, 464/37; 254/323

[56] References Cited

U.S. PATENT DOCUMENTS

| | | | |
|---|---|---|---|
| 4,059,197 | 11/1977 | Iioa | 214/451 |
| 4,535,973 | 8/1985 | Dorr et al. | 254/323 |
| 4,544,136 | 10/1985 | Denman et al. | 254/323 |
| 4,625,947 | 12/1986 | Denman et al. | 254/323 |
| 5,027,933 | 7/1991 | Barnum et al. | 192/56 L |

Primary Examiner—Leslie A. Braun
Assistant Examiner—Andrea Pitts
Attorney, Agent, or Firm—Reising, Ethington, Barnard, Perry & Milton

[57] ABSTRACT

A clutch for a tire lift/carrier winch includes a drive plate and a driven plate having a plurality of elongate springs thereon. The driven plate includes circumferentially spaced driven end portions which are positioned in driving engagement with circumferentially spaced drive portions of the drive plate to permit rotation of the driven plate upon rotation of the drive plate when the load on the cable winding spool is within a prescribed limit. However, when the load on the cable winding spool exceeds the prescribed limit, the elongate springs on the driven plate function as cantilevered spring segments deflectable about respective fulcrums in such a manner as to prevent rotation of the driven plate upon rotation of the drive plate.

6 Claims, 2 Drawing Sheets

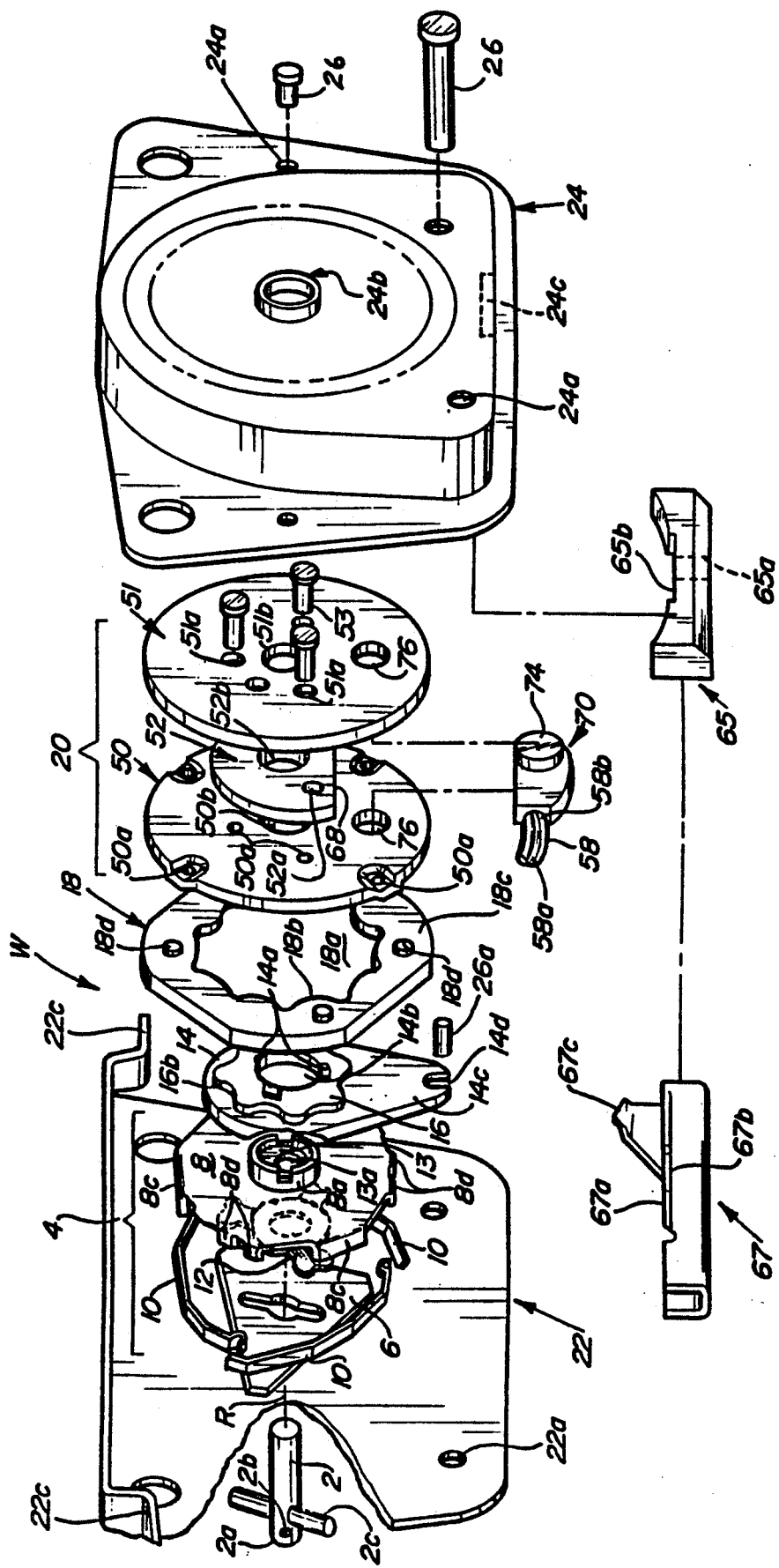

CLUTCH FOR TIRE LIFT/CARRIER WINCH

This is a continuation of application Ser. No. 631,965, filed on Mar. 14, 1991, which is a continuation of application Ser. No. 345,577, filed May 1, 1989, now U.S. Pat. No. 5,027,933.

FIELD OF THE INVENTION

The present invention relates to winches, such as a tire lift/carrier winch, and, more particularly, to an improved clutch mechanism for a tire lift/carrier winch.

BACKGROUND OF THE INVENTION

The design of certain types of vehicle body styles necessitates the storage of the spare tire under the vehicle. This mode of spare tire storage is of particular advantage with pick-up trucks, mini-vans and other vehicles. In such applications, a winch is mounted on the underside of the vehicle carriage for winding or unwinding a cable having the spare tire carried on an end fitting thereof. The winch is used to wind the cable on a spool to draw the spare tire against the underside of the vehicle carriage and unwind the cable from the spool to lower the spare tire to the ground for access and use. U.S. Pat. Nos. 4,059,197; 4,535,973; 4,544,136 and 4,625,947 describe tire lift/carrier winches for such applications.

An overload clutch mechanism has been used in such tire lift/carrier winches to allow winch operation only when the load on the spool is within a maximum prescribed limit. For example, in the event the operator of the winch attempts to actuate the winch when the cable spool is subjected to an overload (e.g. such as when the spare tire is fully lifted or its upward movement is obstructed), the clutch mechanism functions to disengage the cable winding spool and the manually actuated drive shaft of the winch to prevent damage to the winch components.

Various types of spring clutch mechanisms have been developed to this end. U.S. Pat. Nos. 4,544,136 and 4,625,947, illustrate spring clutch mechanisms employed between the drive shaft and the cable winding spool of the winch wherein a plurality of springs are caused to deflect out of driving relation with an adjacent clutch component in an overload situation to prevent rotation of the cable winding spool by the drive shaft.

In a particular tire lift/carrier winch sold commercially by a subsidiary of Applicant's assignee, the spring clutch comprises three springs manufactured to precise tolerances to interlock and function as a single ring that in an overload situation is deflected out of generally circular shape. In this spring clutch, the springs are arranged in an annular array on a clutch driven plate with opposite ends of the springs interlocked. In the normal drive mode (static mode), an intermediate portion of each spring rests against a retaining tab formed on the driven plate. In an overload situation, the interlocked opposite ends of adjacent springs are displaced (deflected) radially outward by the drive plate and the intermediate portion of each spring moves radially inward away from the respective retaining tab as the ring is deflected out of circular shape. The reaction direction of each spring to such deflection is generally parallel with the respective retaining tab.

It is an object of the invention to provide a clutch mechanism for a winch, such as a tire lift/carrier winch, having significantly reduced tolerance requirements for the clutch springs.

It is another object of the invention to provide such a clutch mechanism wherein the clutch provides more consistent and precise tripping torques (i.e. the torque needed to disengage the clutch from the driving mode).

It is another object of the invention to provide such a clutch mechanism exhibiting minimal decay of the tripping torque after anticipated cycles of use.

It is another object of the invention to provide such a clutch mechanism producing significantly reduced variations in cable tension during operation of the clutch.

SUMMARY OF THE INVENTION

The invention contemplates a clutch for a winch, such as a tire lift/carrier winch, having a drive shaft for rotating a cable or chain winding spool. The clutch includes a drive plate mounted on the drive shaft for rotation therewith and having a plurality of circumferentially spaced apart drive portions disposed generally on a first circle of a given radius relative to the axis of rotation of the drive shaft. The clutch also includes a driven plate disposed adjacent the drive plate and having a plurality of springs thereon with each spring having a driven end portion. The driven end portions of the springs are circumferentially spaced apart generally on a second circle of another radius relative to the aforesaid axis of rotation such that a respective one of the drive portions drivingly engages a respective driven end portion to effect rotation of the driven plate about said axis upon rotation of the drive plate when the load on the cable winding spool is within a maximum prescribed limit. However, each spring is mounted on the driven plate in cantilever manner so as to deflect about a fulcrum to prevent rotation of the driven plate by the drive plate when the load on the cable winding spool exceeds the prescribed limit.

In one embodiment of the invention, each spring includes a first driven end portion and a second end portion. The springs are arranged in an annular array (generally circular array) with the second end portion of one spring contacting the first driven end portion of the next adjacent spring. Each spring is mounted on the driven plate in such a manner as to provide a fulcrum between its first driven end portion and second end portion and about which fulcrum each spring deflects in an overload situation to prevent rotation of the driven plate. Preferably, in this embodiment, the second end portion of each spring contacts the first driven end portion of the next adjacent spring in such a manner that the contacting ends are both deflected about a fulcrum of the respective spring. In this way, each spring in effect acts as two separate cantilevered spring segments deflectable about a fulcrum. Each spring may include a pair of spaced apart fulcrums formed on the intermediate portion of each spring in such a manner as to provide a self-retaining action of the intermediate portion against a respective retaining tab of the driven plate.

BRIEF DESCRIPTION OF THE DRAWINGS

FIG. 1 is an exploded perspective view of a tire lift/carrier winch with a clutch in accordance with the invention.

DETAILED DESCRIPTION OF THE INVENTION

Figure 3:
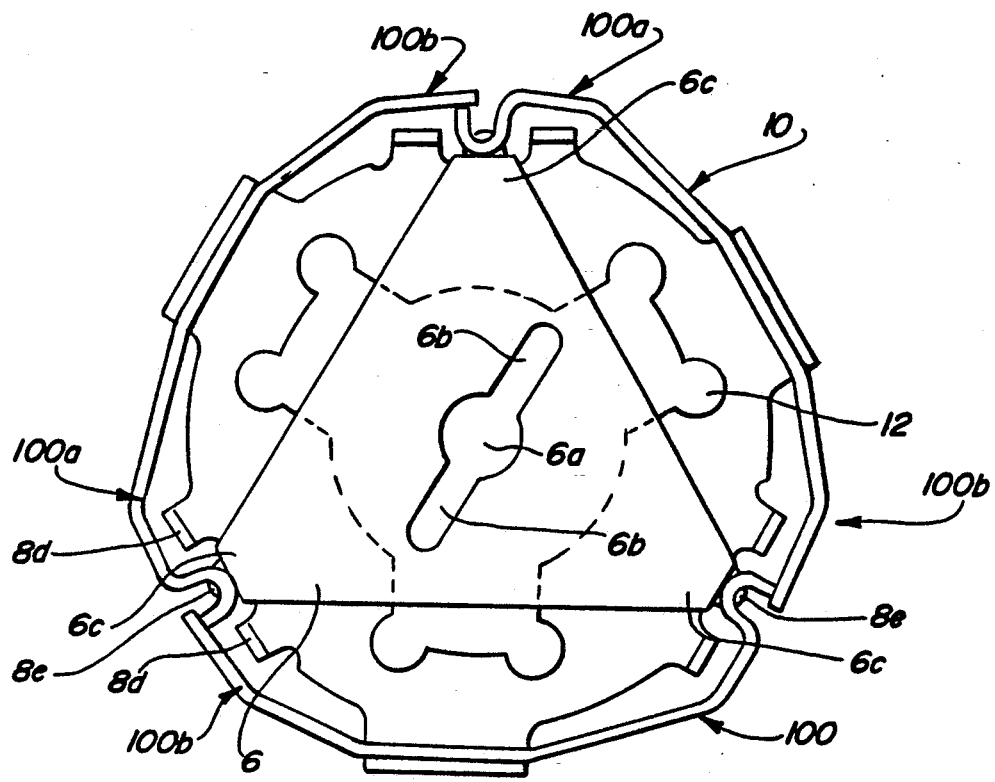
FIG. 3 is similar to FIG. 2 with the spring clutch shown in the released mode to prevent rotation of the cable winding spool.

Referring to FIG. 1, a tire lift/carrier winch W is shown including a drive shaft 2 rotatable about axis R and an overload clutch 4 in accordance with the invention having a drive plate 6 and a driven plate 8 disposed adjacent the drive plate and having a plurality of springs 10 thereon. A friction spring 12 may be disposed between the drive plate 6 and the driven plate 8. The winch is also shown as including an eccentric cam 13, a torque arm 14 with a driving gear 16 attached thereon by bent tabs 14a of the torque arm or other fastening means, an annular driven gear 18 and a sheave or spool assembly 20. These winch components are disposed in operative side-by-side relation on the drive shaft 2 between the opposing housing plates 22,24 that are connected together by suitable means, such as rivets 26, to enclose the winch components. Each housing plate 22,24 includes rivet-receiving holes 22a,24a to this end.

Each housing plate 22,24 includes respective coaxial apertures (only aperture 24b shown) to rotatably receive the opposite ends of the drive shaft 2 in a manner known in the art. One end 2a of the drive shaft 2 extends outside the housing plate 22 when the winch components are assembled and includes a cross bore 2b by which the drive shaft 2 can be rotated to lift or lower a vehicle tire carrier (not shown).

The driven plate 8 includes a hub 8a extending axially toward the torque arm 14. The hub 8a receives and is keyed to the eccentric cam 13 which has diametral keys received in hub keyways as shown in FIG. 1. The hub 8a and the cam 13 have coaxial centers or axes offset from the rotational axis R of the drive shaft. The center or axis of the opening 13a in the cam 13 is coaxial with axis R to receive drive shaft 2.

The torque arm 14 includes an opening 14b receiving the hub 8a and the eccentric cam 13 therein and includes an extension 14c having an elongate slot 14d. The elongate slot 14d receives the intermediate shaft 26a of one of the rivets 26 holding the housing plates 22,24 together. The slotted extension 14c and intermediate shaft 26a of the rivet cooperate to impart oscillatory motion to the torque arm 14 and driving gear 16 thereon in known manner when the drive shaft 2 is rotated. When the drive shaft 2 is rotated, the drive plate 6 and driven plate 8 rotate about the axis of rotation R with the hub 8a and the cam 13 rotating eccentrically about axis R by virtue of their centers or axes being offset relative to axis R.

The annular driven gear 18 includes a central opening 18a receiving the driving gear 16 attached on the torque arm 14 and includes multiple inner teeth 18b that mesh with the outer teeth 16b of the driving gear 16. The driven gear 18 includes side face 18c facing the side plate 50 of the sheave assembly 20. The side face 18c of the driven gear includes a plurality of integrally formed studs 18d extending parallel to one another and to the axis of rotation R of the drive shaft 2.

The studs 18d are received in press fit in a respective coaxially aligned hole 50a formed. In the side plate 50 in order to drive the sheave or spool assembly 20 in rotation about axis R.

The spool assembly 20 includes the side plate 50, another side plate 51 spaced therefrom and a spool center plate 52 as well as a cable 58 disposed between the side plates 50,51. The cable 58 includes a free end 58a adapted for connection to a load, such as a tire lift/carrier (not shown) engaged to a spare tire, and a second end 58b having a cable end fitting 70 coupled thereon; e.g., crimped, die cast, molded or otherwise secured on or made integral with the end 58b. The end fitting 70 includes opposite transversely extending ears 74 (only one shown) that are rotatably received in an aperture 76 in each side plate 50,51 to rotatably support the end fitting 70 adjacent and outboard of a flat exterior shoulder 68 on the center sheave plate 52 between the side plates 50,51.

The spool or sheave side plates 50,51 and center plate 52 are joined together to form the spool assembly 20 by three rivets 53 extending through aligned holes 50a,51a,52a in the respective sheave plates 50,51,52. Spool plates 50,51,52 include a respective central opening 50b,51b,52b through which the drive shaft 2 extends. The spool plates 50,51,52 are in bearing relation on the drive shaft 2.

In the winch shown in FIG. 1, rotation of the drive shaft 2 causes oscillation of the driving gear 16 as controlled by reciprocation of slotted extension 14c of the torque arm 14 relative to the intermediate rivet shaft 26a and a corresponding driving of the annular driven gear 18 in rotation about axis R. The annular driven gear 18 in turn drives the sheave assembly 20 in rotation through studs 18d press fit in holes 50a in the sheave side plate 50 to wind the cable 58 on the center sheave plate 52 when the sheave assembly 20 is rotated clockwise and to unwind the cable when the sheave assembly is rotated counterclockwise. This type of gear train and its operation are shown in the aforementioned U.S. Pat. Nos. 4,059,197 and 4,544,136, the teachings of which are incorporated by reference.

A cable guide member 65 is disposed in the housing plates 22,24 when the winch components are assembled. In particular, the cable guide 65 includes a slot 65a aligned with a slot 24c in the bottom wall of the housing plate 24. The cable 58 extends through these slots outside the housing toward the vehicle spare tire carrier (not shown).

An anti-reverse pawl 67 is also provided in the winch construction and includes a forked arm 67a with a slot 67b. The forked arm overlies flat surface 65b on the guide member 65 such that the slot 67b straddles the slot 65a. The cable 58 passes through the slot 67b as it exits or enters the winch W through the aforementioned slots 24c,65a. The pawl 67 also includes a pawl arm 67c which is adapted to engage the axially extending tabs 8c,8d on the driven plate 8 to prevent excessive rotation of the sheave assembly 20 in the unwind direction (counterclockwise rotation) and to prevent rewinding of the sheave assembly 20 in the wrong direction as fully explained in U.S. Pat. No. 4,535,973, the teachings of which are incorporated herein by reference.

The winch W is attached to the bottom of a vehicle by attachment flanges 22c on the housing 22 and by suitable fasteners (not shown) extending through holes provided in the flanges 22c.

The friction spring 12 may be provided between the drive plate 6 and the driven plate 8 to provide supplemental friction in the winch for hindering unwinding of the cable and release of the tire carrier from a stowed position on the vehicle as a result of vibrations during use on the vehicle. Alternatively, the gear train of the winch can be rendered self-locking in accordance with copending application Ser. No. 704,707, filed May 17, 1991 and entitled "Tire Lift/Carrier Winch With Self-Locking Gear Train" of common assignee herewith, the teachings of which are incorporated herein by reference.

The overload clutch 4 functions to permit rotation of the spool assembly 20 upon rotation of the drive shaft 2 when the load on the spool assembly 20 is within a maximum prescribed limit but to prevent rotation of the spool assembly 20 in the event the load thereon exceeds the prescribed limit; e.g. in the event the cable 58 (or chain or like connector) is subjected to an overload situation such as when upward movement of the tire lift/carrier is obstructed for some reason or when the tire lift/carrier is already at its final full height stowed position.

Figure 2:
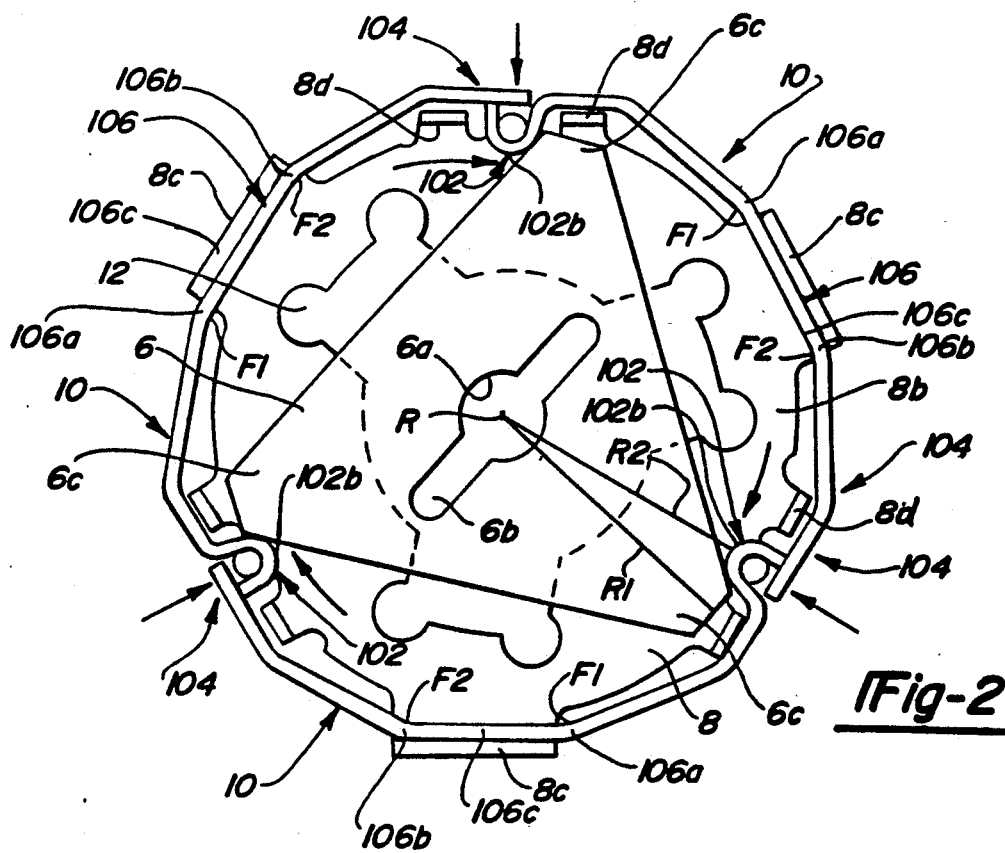
FIG. 2 is a side elevational view of the spring clutch of the invention in the normal drive mode to rotate the cable winding spool.

The clutch 4 in accordance with the invention is shown in greater detail in FIGS. 2 and 3. The drive plate 6 comprises a generally triangular-shaped plate having a central aperture 6a coaxial with axis R to receive the drive shaft 2 and cross-slots 6b on opposite sides of the aperture 6a to receive in driving relation the opposite ends of a diametrical pin 2c on the drive shaft 2 so that drive plate 6 is rotated by shaft 2. The drive plate 6 also includes three circumferentially spaced apart drive portions 6c that are disposed generally on a circle of a radius R1 relative to the axis of rotation R of the drive shaft 2. It is apparent that each drive portion 6c comprises a truncated corner of the triangular-shaped drive plate 6.

The driven plate 8 includes a flat plate portion 8b that is generally parallel to the drive plate 6 when the winch components are assembled. The plate portion 8b includes the offset hub 8a. As mentioned hereinabove, the hub 8a receives and is keyed to the eccentric cam 13 having the opening 13a whose center or axis is coaxial with axis R. The drive shaft 2 extends through the opening 13a of the cam 13. Rotation of the eccentric cam 13 and hub 8a imparts oscillatory motion to the torque arm 14 to drive the spool assembly 20 in rotation to either wind the cable 58 thereon or unwind the cable 58 therefrom depending upon the direction of rotation of the drive shaft 2.

The driven plate 8 includes three axially extending spring retaining tabs 8c and three slotted spring guide tabs 8d spaced circumferentially and equidistantly about its outer periphery and extending axially or transversely relative to the plane of the plate portion 8b. Retaining tabs 8c are equally radially spaced from axis R. Guide tabs 8d are equally radially spaced from axis R. A flat tit 8e (i.e., coplanar with flat plate portion 8b) is disposed between guide tabs 8d to maintain dynamic alignment of the respective spring 10 adjacent thereto between tabs 8d.

Three elongate, metal springs 10 are disposed on the driven plate 8 as shown best in FIGS. and 3. Each spring 10 includes a first driven end &portion 102 formed of metal strip bent back upon itself in a Unshape, a second end portion 104 and an intermediate portion 106. Intermediate portion 106 includes two radiused bends or kinks 106a,b that define respective fulcrums F1, F2 of each spring 10. By virtue of its configuration (i.e., having fulcrums F1,F2 with an interconnecting flat portion 106c therebetween), the intermediate portion 106 is normally retained or abutted against the retaining tabs 8c without the need for any fastening means. In other words, the springs 10 exhibit a self-retaining action against a respective retaining tab 8c.

The springs 10 are arranged in an annular array (e.g., a generally circular array) on the periphery of the driven plate 8 with the second end portion 104 of one spring overlying and contacting the Unshaped first driven end portion 102 around the array. Each Unshaped first driven end portion 102 is received in the slot of a respective guide tab 8d as shown.

As is apparent in FIG. 2, in the normal drive mode of the clutch 4 the first driven end portions 102 include inner sides 102b that are disposed generally on a circle of a radius R2 (relative to rotational axis R) that is less than the radius R1 of the circle on which the drive portions 6c of the drive plate 6 are disposed. As a result, each drive portion 6c is drivingly engaged against a respective first driven end portion 102 of each spring 10. This driving engagement will be provided regardless of whether the drive plate 6 is rotated by the drive shaft 2 in a clockwise or a counterclockwise direction about axis R. As a result, rotation of the drive shaft 2 will cause rotation of the driven plate 8 about axis R through drive plate 6 and springs 10 in the normal drive mode of the clutch 4 when the load on the spool assembly 20 is within the maximum prescribed limit. Of course, rotation of the driven plate 8 in turn effects rotation of the eccentric cam 13 and hub 8a to drive the torque arm 14 in oscillation. As explained hereinabove, oscillatory motion of the torque arm 14 drives the annular driven gear 18 in rotation about axis R to rotate the spool assembly 20 to wind or unwind the cable 58 depending upon the direction of rotation.

In the event the spool assembly 20 is subjected to a load exceeding the maximum prescribed limit for reasons explained hereinabove, the springs 10 are designed to deflect about the fulcrums F1, F2 upon rotation of the drive plate 6 in such a manner as not to transmit a driving torque to driven plate 8 and thereby to prevent rotation of the driven plate 8. In particular, as drive portions 6c are rotated relative to the first driven end portions 102 of the springs 10, the first driven end portions 102 are caused to deflect radially outward, FIG. 3, about fulcrum F1. Moreover, when each first driven end portion 102 deflects radially outward, it causes similar outward radial deflection of the second end portion 104 thereon about fulcrum F2. As a result, each spring 10 in effect acts as two cantilevered spring segments 100a,100b deflectable about respective fulcrums F1,F2 so as not to transmit a driving torque to the driven plate 8. In the exemplary embodiment of the invention of FIGS. 1-3, the three springs 10 in effect act as six (6) cantilevered spring segments 100a,b which exhibit both a spring displacement and spring reaction direction in the radially outward direction, as shown best in FIG. 3.

When the overload situation on the spool assembly 20 ends, the springs 10 will return to the positions shown in FIG. 2 so as to drivingly engage the drive portion 6c and thereby permit rotation of the driven plate 8 upon rotation of the drive plate 6.

The spring arrangement of FIGS. 1-3 provides more consistent and precise tripping torques; e.g., typically providing tripping torques falling within a narrower range than the tripping torques provided by the interlocked springs of the commercial winch described hereinabove in the Background Of The Invention portion hereof. In particular, the tripping torques produced by the spring arrangement of FIGS. 1-3 typically vary by one-third ($\frac{1}{3}$) the amount of tripping torques produced by that aforementioned commercial winch. Moreover, there is negligible decay of the tripping torque on endurance after anticipated cycles of use. For example, after 100 tripping cycles, the tripping torque of the clutch 4 of FIGS. 1-3 shows a negligible decay whereas the tripping torque of the clutch of the aforementioned commercial winch decays (i.e., is reduced by) 30%-40%. Also, variations in cable tension and the resultant torque load on the spool assembly 20 provided by operation of the clutch 4 are significantly reduced; e.g. by one-half compared to the clutch of the aforementioned commercial winch. In addition, the cantilevered springs 10 of the clutch 4 of FIGS. 1-3 can be made to much less stringent tolerance requirements and still retain satisfactory operation of the clutch.

Although the springs 10 have been described and illustrated hereinabove as having a pair of fulcrums F1,F2, those skilled in the art will appreciate that each spring 10 may include only a single fulcrum intermediate ends 102,104. If only one fulcrum is provided, each spring 10 will be fastened to the respective retaining tab 8c by suitable fastening means. Moreover, those skilled in the art will appreciate that the clutch 4 may utilize springs having a single cantilevered end portion 102 deflectable about a fulcrum (e.g., fulcrum F1) without the need for the second end portion 104 and its fulcrum (e.g., fulcrum F2). Of course, such springs will be selected to exhibit the desired tripping torque required of the clutch 4. Thus, the invention is not limited to the springs 100 shown that function as two spring segments 100a,b.

While the invention has been described in terms of specific embodiments thereof, it is not intended to be limited thereto but rather only to the extent set forth hereafter in the following claims.

We claim:

1. A clutch for use between a drive shaft and a rotatable spool of a winch, comprising:
   (a) a clutch drive plate mounted on the drive shaft for rotation therewith, said drive plate including a plurality of circumferentially spaced apart drive portions disposed generally on a first circle of a given radius relative to an axis of rotation of said drive shaft,
   (b) a clutch driven plate disposed adjacent the drive plate and having a plurality of springs disposed thereon with each spring including a portion retained at a radial location on the driven plate, a fulcrum proximate the retained portion, and a cantilever segment extending from the fulcrum and having a driven end portion disposed generally on a second circle of another radius relative to said axis and circumferentially spaced about said second circle such that a respective one of said drive portions drivingly engages a respective driven end portion to effect rotation of said driven plate about said axis upon rotation of said drive plate when a load on said spool is within a prescribed limit, and
   (c) each spring being retained on said driven plate by the retained portion thereof so that the cantilevered segment thereof deflects radially about the fulcrum without radial movement of said retained portion to prevent rotation of said driven plate upon rotation of said drive plate when the load on said spool exceeds the prescribed limit.

2. The clutch of claim 1 wherein each spring includes said driven end portion and another end portion with said fulcrum being disposed therbetween.

3. The clutch of claim 2 wherein each spring includes a second cantilevered segment having said another end portion thereon that contacts said driven end portion of a next adjacent spring so that the second cantilevered segment is deflected with the driven end portion of the adjacent spring.

4. The clutch of claim 3 wherein said second cantilevered segment of each spring is deflected about another fulcrum disposed between said driven end portion and said another end portion of that spring such that, in effect, each spring functions as two cantilevered spring segments.

5. A clutch for use between a drive shaft and a rotatable spool of a tire lift/carrier winch, comprising:
   (a) a clutch drive plate mounted on the drive shaft for rotation therewith, said drive plate including circumferentially spaced apart drive portions disposed generally on a first circle of a given radius relative to an axis of rotation of said drive shaft,
   (b) a clutch driven plate disposed adjacent the drive plate and having a plurality of elongated springs disposed thereon with each spring having a first cantilevered segment with a first driven end portion and a second cantilevered segment with a second end portion, said springs being arranged in an annular array with the first driven end portion of each spring overlying the second end portion of a next adjacent spring in the array so as to be disposed radially outboard of that second end portion, said first driven end portions being disposed generally on a second circle of another radius relative to said axis such that a respective one of said drive portions drivingly engages a respective driven end portion to effect rotation of said drive plate about said axis upon rotation of said drive plate when a load on said spool is within a prescribed limit, and
   (c) each spring having first and second fulcrums between said first driven end portion and said second end portion such that the first and second cantilevered segments are deflected about the respective first and second fulcrums to prevent rotation of said plate upon rotation of said drive plate when the load on said spool exceeds the prescribed limit.

6. The clutch of claim 5 wherein the first and second fulcrums of each spring are spaced apart to provide an interconnecting portion that is retained against a retaining tab formed on the driven plate when said first and second cantilevered segments are deflected radially.

* * * * *

UNITED STATES PATENT AND TRADEMARK OFFICE
CERTIFICATE OF CORRECTION

PATENT NO. : 5,277,288
DATED : January 11, 1994
INVENTOR(S) : Barnum et al.

It is certified that error appears in the above-identified patent and that said Letters Patent is hereby corrected as shown below:

Column 5, line 56, after "FIGS.", insert -- 2 --.

Line 57, delete &portion" and insert -- portion --.

Line 58, delete "Unshape" and insert -- U-shaped --.

Column 6, line 4, delete "Unshaped" and insert -- U-shaped --.

Column 8, line 44, delete "drive" and insert -- driven --.

Signed and Sealed this

Twenty-third Day of July, 1996

Attest:

BRUCE LEHMAN

Attesting Officer    Commissioner of Patents and Trademarks